UNITED STATES PATENT OFFICE.

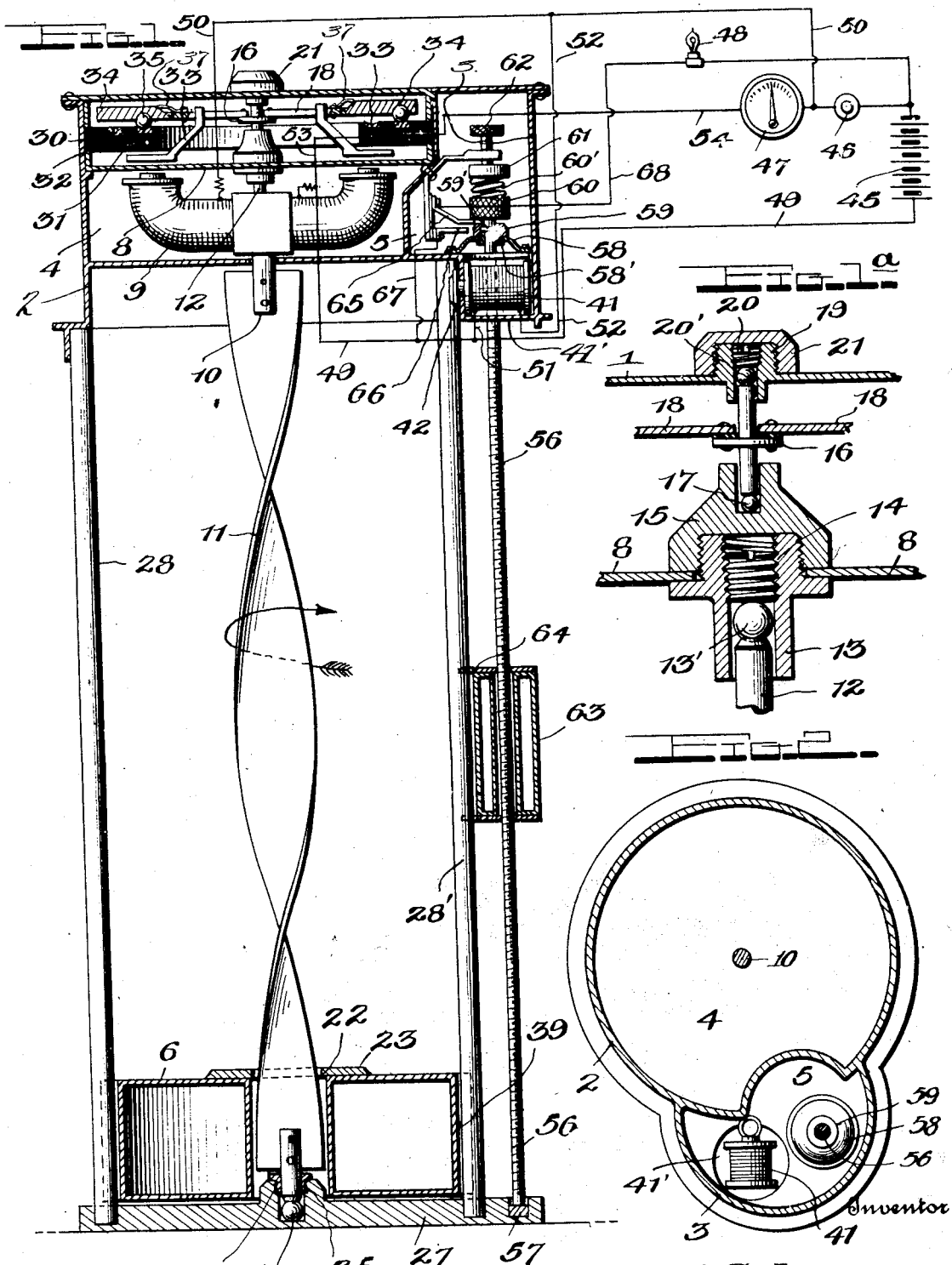

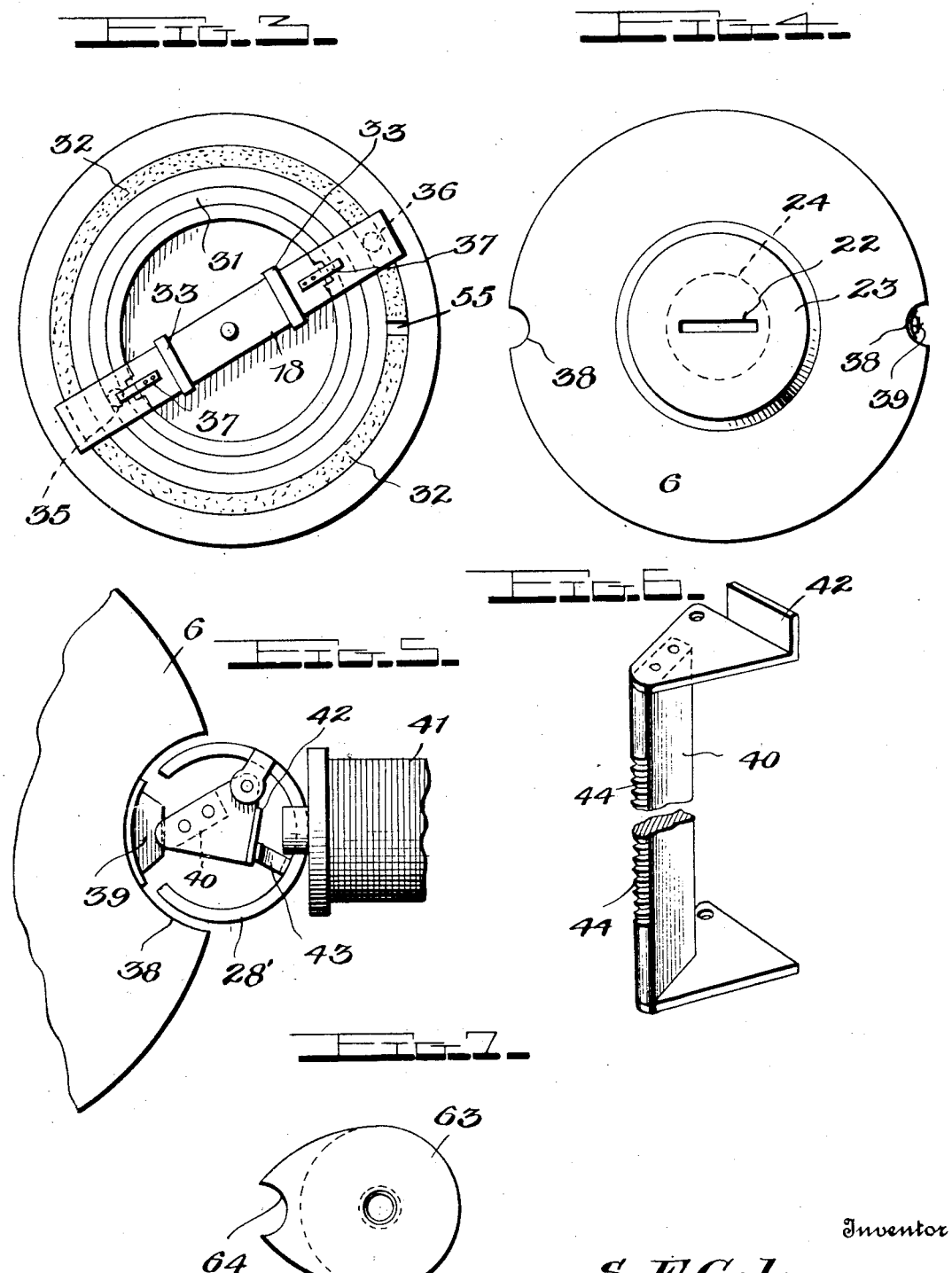

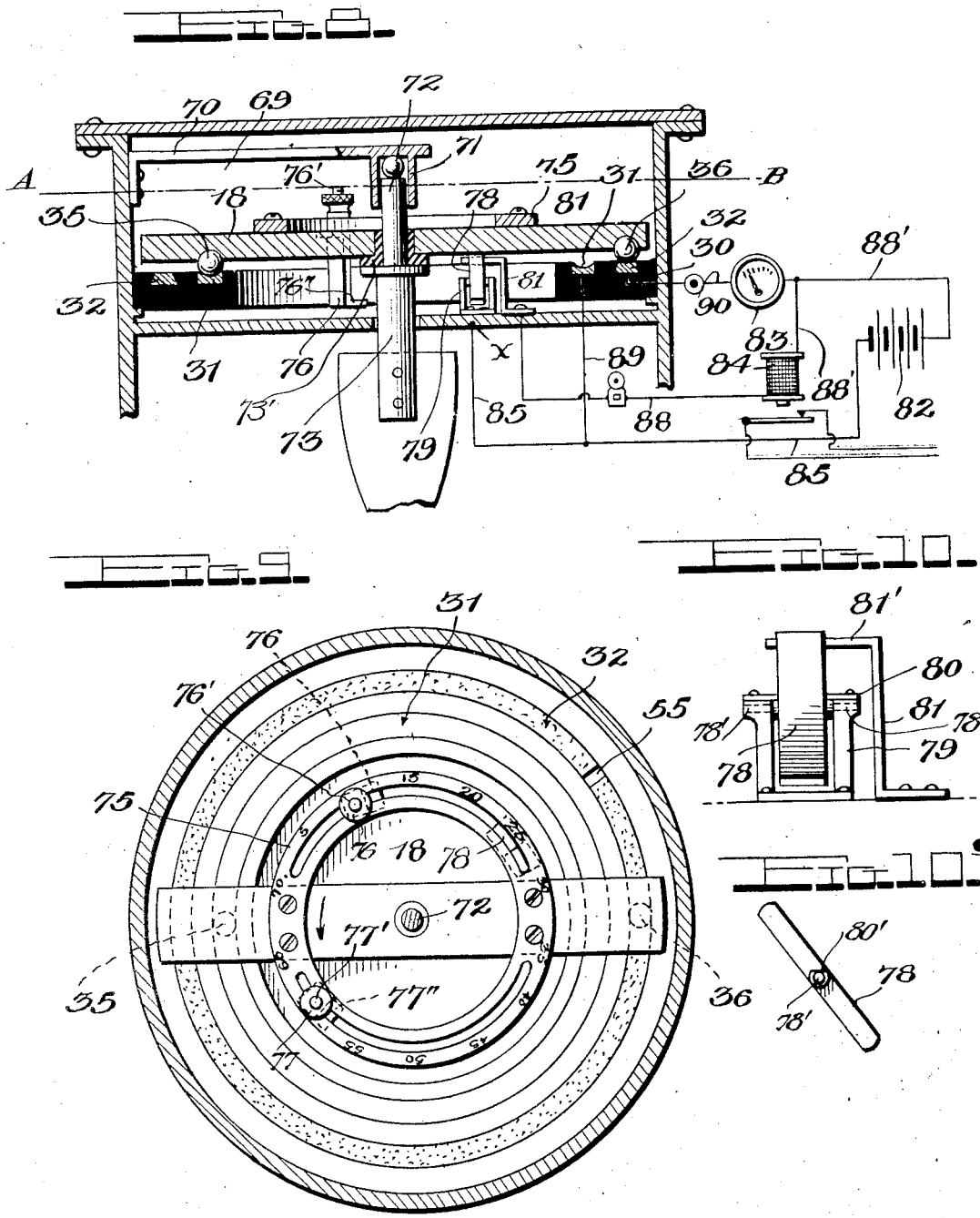

SAMUEL F. COLE, OF PURCELLVILLE, VIRGINIA.

ELECTRICAL INDICATING DEVICE.

1,304,022.  Specification of Letters Patent.  Patented May 20, 1919.

Application filed May 25, 1915.  Serial No. 30,335.

*To all whom it may concern:*

Be it known that I, SAMUEL F. COLE, a citizen of the United States, residing at Purcellville, in the county of Loudoun and State of Virginia, have invented certain new and useful Improvements in Electrical Indicating Devices, of which the following is a specification.

The invention relates to electrical indicating devices in general, but is more particularly designed to indicate the quantity of liquids of an explosive nature, such as gasolene, alcohol, etc., by means of certain electrical devices located at a distance from the liquid container or other receptacle, either by measure, (gallons) or by the position of the liquid within the container or other vessel.

One of the chief objects of the invention is the provision for indicating the water-level in a boiler or other vessel and replenishing the same by automatically setting into operation a pump, an injector, or other liquid supplying means, and automatically stopping the operation.

Another object of the invention is to provide for automatically indicating the quantity of liquid within the container or other vessel when it has become diminished to any predetermined level or quantity.

Still another object of the invention is the obtaining of a liquid level indicator or gage by calibrating the face of a volt or ampere meter, so that by means of suitable mechanism to vary the voltage or amperage the quantity of liquid will be indicated, either by measure, (gallons) or by the liquid-level, as for example, full, three-fourths, one-half, one-quarter, empty.

Other objects of the invention will become apparent upon a complete disclosure thereof.

In the drawings:

Figure 1, is a central, vertical section of my liquid level indicator as an entirety; Fig. 1ª, is a detail enlarged, of the loose connection supporting the electric-magnet; Fig. 2, a transverse section of the main and auxiliary-chambers inclosing the operating devices; Fig. 3, a top plan of the cross connecting-bar, and rings; Fig. 4, a top plan of the main float; Fig. 5, a detail of the secondary magnet, armature and brake enlarged; Fig. 6, a similar view, somewhat enlarged, of the brake and armature; Fig. 7, a top view of the auxiliary float; Fig. 8, a modified form of the upper portion of my device; Fig. 9, a view in transverse section on line A—B and Figs. 10, and 10ª are details of the starting and stopping contact.

In the several views, the numeral 2 indicates a main casing, and 3 an auxiliary casing, closed at top and bottom to form chambers 4 and 5 respectively, the chamber 4 containing the devices operated by the main float 6, and the chamber 5 for containing the devices for operating the indicating float 63, and a secondary magnet for releasing the main float 6. The chamber 4 is divided into upper and lower compartments by a thin metal partition 8, the lower compartment containing a double-pole electro-magnet 9, to which is attached by means of a hanger strap 10, a spirally shaped or twisted thin metal blade 11, the strap being provided with an upwardly projecting arm 12 journaled in a nipple 13 having a ball-bearing 13′ as shown in Figs. 1 and 1ª. The nipple is internally screw-threaded to receive a screw-threaded plug 14, by means of which the ball-bearing may be adjusted. The said nipple is also externally screw-threaded so as to permit of its being inserted into an aperture in the metal partition, and screwed into a nut 15, between which and the nipple 13 the metal partition is clamped. The head of the nut 15 is bored to receive the lower arm of a connector 16, said bore being provided with a ball-bearing 17. The upper arm of the connector passes through a connecting-bar 18, suitably insulated therefrom, and is journaled in the bore of a nipple 19 passing through the center of the top of the casing, a screw-threaded plug 20 being employed to adjustably confine the ball-bearing 20′ within its bore, and a screw-threaded cap 21 is screwed upon the upper end of the nipple as a closure.

The lower end of the spirally-shaped blade passes through a slot 22 in a disk or plate 23 into a central opening 24 of the main float 6, the extreme lower end of the said blade being provided with an arm 25 which is seated in a socket 26 made in a cross-piece 27 which connects the guide-bars 28 and 28′ together, said socket being provided with a ball bearing 29. Thus it will be seen that the electro-magnet and its attached blade is supported between the ball-bearings 13' and 29, and the connecting-bar between ball-bearings 17 and 20', the guide 28' being hollow and longitudinally slotted. The guide 28' is hollow and longitudinally slotted to accommodate brake 40 and to permit movement of brake-lug 39, as hereinafter described.

In the upper compartments of the chamber 4, which is air-tight, is a ring 30 of fiber or other suitable non-conducting material, and embedded in the non-conducting ring is a metal ring 31. Also embedded in the non-conducting ring is a ring 32 of compressed carbon and graphite or other suitable resistance material. Fastened to the connecting-bar 18, at each side of the center thereof, is an armature 33, and hinged to each end of said connecting-bar is preferably an extension 34, the under surface of one extension being provided with a slight depression in which is seated a contact ball 35 in contact with the metal ring 31, and the under face of the other extension is provided with a similar depression in which is seated a contact ball 36 in contact with the resistance ring, both balls maintaining contact with their respective rings during the movement of the connecting bar in either direction when the electro-magnet is energized. The hinged extensions 34 are provided with light springs 37, 37, see Fig. 3, which serve to insure contact between the balls 35 and 36 with their respective rings.

The float 6 is provided with a vertical groove 38 adapted to engage the guide-rod 28 and be guided thereby in its vertical movements. The float is also provided with a brake-lug 39 arranged to be engaged by a brake 40 whereby said float is normally held until the magnet 41 is energized, as will be hereinafter explained.

Located in the chamber 5 is a small secondary magnet 41 inclosed in a casing 41' with its pole projecting through the side thereof, so as to attract and make contact with an armature 42 fastened to the top of the brake 40, said armature being provided with a strip 40' adapted to be contacted by a light vertical spring 43. Pivoted to the side of the guide 28' is the brake 40 which has its inner edge provided with teeth 44 adapted to be engaged by the brake-lug 39 on the float 6, and hold said float, as heretofore stated.

The numeral 45 indicates a battery; 46 a push-button; 47 an ampere or volt meter, and 48 an electric lamp or other signal. Line wires 49 and 50 connect the battery with the electro-magnet 9.

In operation: When it is desired to learn the quantity of gasolene in the tank in which my gage is placed the button 46 is pressed, closing the circuit. The current flows from battery over line wire 49 to the magnet 9 and back over line wire 50 to battery. The magnet attracts the armature 33 and holds the same in any position which the magnet may assume. The current flows over conductor 51 from line wire 49 to magnet 41, and over conductor 52 to line wire 50. The magnet 41 attracts the armature 42, and the brake 40 is disengaged from the brake lug 39 on the float 6, releasing said float so as to allow it to move up or down as the case may be, during the time in which the current is flowing. The movement of the float causes the magnet 9 to revolve, which in turn, causes the connecting-bar 18 to revolve. Simultaneously with the release of the float 6, and the consequent movement of the balls 35 and 36 on their respective metal and resistance rings, the ring 31 being in electrical connection with line wire 49 by conductor 53, and the resistance ring being in electrical connection with the ampere or volt meter 47 by conductor 54, the current will pass through ball 35 to connecting-bar 18, from which it passes by way of ball 36 to the resistance ring 32; and thence by way of conductor 54 to the meter 47. The resistance ring is not a complete annulus, being provided with an air-gap 55 so as to insure current flowing in proper direction as shown in Fig. 3. As the quantity or force of the current entering the meter, which is calibrated in either gallons or position of the liquid, as hereinbefore stated, is dependent upon the position of the ball 36 on the resistance ring, it will be evident that the position of the float 6, or the quantity of liquid may be thus indicated at a distance from the liquid container.

As the above described mechanism is operative only when the electric circuit has been closed by means of the push-button 46, the following described mechanism has been provided, so that a predetermined quantity of liquid may be indicated without special attention by the operative, or without the use of current until said predetermined quantity is reached.

A screw-threaded rod 56 has its lower end stepped, with a slight vertical play, in a socket 57 made in the connecting-piece 27, and has its upper end passing through a flexible disk 58 which is clamped between a flanged nut 58' and a clamping-nut 59, the screw threaded rod 56 being provided with a collar 59' which is also clamped between the clamping nuts 58' and 59. The upper end of the rod 56 is also provided with a thumb-nut 60, in the upper face of which is seated one end of a coil spring 60', the other end of said spring being seated in a cup-shaped disk 61, the spring being tensioned by a thumb-screw 62. Vertically movable on the rod 56 is a float 63, said float being prevented from rotation by a vertical groove 64, Fig. 7, which engages the guide-rod 28' and by means of which the float is guided in its vertical movements.

The quantity of liquid desired is placed in the container, and the float 63 moved to the level of the liquid by means of the thumb-nut 60. The tension force of the spring 60' which is regulated by the thumb-screw 62, will force the rod 56 into the socket 57 and as the float 63 is slightly raised, the flexible holder or disk 58 will readily yield to the slight vertical movement of the rod 56. It will be evident that by means of thumb-screw 62 and thumb-nut 60, the operation of this device may be so regulated that the removal of the upward movement of rod 56 caused by the buoyancy of the float 63, will cause a depression of the holder or disk 58, through the medium of the spring 60'. During this operation a contact spring 65 will be forced into contact with a contact strip 66 as the thumb-nut 60 is depressed. The contact of the spring 65 with the strip 66 closes the circuit whereupon the current passes from battery over wire 49 to conductor 67 thence to contact 66, and from contact 66 to spring 65, and thence back to battery by way of conductor 68 and lamp 48, the lamp, meter and push-button being located at a distance from the liquid container, but within sight of the operative.

Referring particularly to Figs. 8, 9, 10, and 10ᵃ, the indicator therein shown is modified to indicate the quantity or position of the liquid, especially liquids other than those of an explosive character, such for instance, as water, and has for its object to automatically start and stop the action of an injector for a steam or other boiler, or pump in a pneumatic water system.

The numeral 69 is an air-tight compartment, similar to the upper compartment of the chamber 4, in which is arranged a metal strip or bar 70, adjustably fastened to the wall of the compartment, the other end of the strip or bar being provided with a hollow boss or hub 71, in which is received the upper end 72 of the hanger 73 which passes through an aperture in the connecting-bar 18 and is provided with a ball-bearing, the aperture being lined with an insulating flanged bushing 73', the flanged portion thereof serving to insulate the connecting-bar from and to cement or hold said bar to 72 and the flanged portion of 73.

Located below the connecting-bar is the non-conducting ring 30 in which is embedded the metal ring 31 and the resistance ring 32, and between the connecting-bar and the rings are the contact-balls 35 and 36 in contact with their respective rings. In the present instance the slotted or divided ring 75 is attached to the connecting-bar and revolves therewith in either direction. The slotted ring may be of any suitable material, and is provided with a starting control-bar 76 and with a stopping control-bar 77, both bars capable of being adjusted at any desired point on the slotted ring by means of thumb-screws 76' and 77' respectively, each bar being provided with a horizontal projection 76'' and 77'' respectively, for a purpose to be presently explained.

Situated in line with the air-gap 55 so as to be alternately engaged by the projections on the starting and stopping-bars, is an oscillatory contact 78 journaled in the arms of a yoke 79, more clearly shown in Fig. 10ᵃ, said yoke being fastened to and grounded on the bottom of the compartment. Journal arms 78' and 78'' of the oscillatory contact are formed or provided with a blunt-pointed, cam-shaped upper surface 80' and 80'' respectively, upon which one end of a flat spring 80 bears to temporarily hold oscillatory contact to any position to which it may be shifted by the projecting arm of either the starting or the stopping-bars, as the connecting-bar and its attached slotted-ring is moved or rotated in one direction or the other.

Arranged in close proximity to the oscillatory contact is a stop-plate 81, insulated from the casing and provided with a projecting arm 81' at its upper end, said arm being adapted to be engaged by the said oscillatory contact and temporarily close the contact when its position is shifted by the starting-bar in the rotatable movement of the slotted ring and connecting-bar, the engagement being broken upon the reverse movement of the said ring and connecting-bar.

The numeral 82 indicates the battery; 83 the volt or ampere meter, calibrated in gallons or level of liquid as is also the slotted ring, and 84 an ordinary electro-magnetic switch. A wire 85 leading from the battery is grounded at X in the bottom of the casing as is also the yoke 79, said stop-plate 81 being electrically connected to the switch 84, which may be of any approved construction adapted to set into operation a pump or an injector, and to stop the same, over a control circuit 91.

In operation: The current flows over line 85 to bottom of casing; from casing to the oscillatory contact 78 thence to stop-plate 81; from said stop-plate over conductor 88 to switch 84, and from said switch back to battery, over conductor 88'. The current also flows from battery to metal ring 31 over conductor 89, and to connecting-bar by way of the ball 35; from the connecting-bar to resistance ring 32 by way of ball 36; thence to meter over conductor 90, and back to battery over conductor 88'. A push button may be installed in the circuit leading to the meter, and a signaling device in the circuit leading to the switch.

Supposing the starting-bar to be at the mark indicating ten gallons on the slotted-ring, and the stopping-bar at 60 gallons as shown on Fig. 9, upon the circuit being closed the connecting-bar and its attached ring will be caused to move in the direction of the arrow, until the stopping-bar breaks the contact between the arm 81' and the upper part of the oscillatory-contact, (which has been pushed into contact with said arm by the projection on the lower end of the starting-bar). After the contact is broken, the connecting-bar and its attached ring, moves in the opposite direction, (as the water in the vessel diminishes) until the projection on the starting-bar encounters the oscillatory contact, shifting its position so that its upper part will come into engagement with the arm 81', and set the pump or injector into operation to pump water into the vessel.

Various changes or modifications may be made in the construction of my invention without departing from the scope thereof, or sacrificing its principle, such for instance, as providing a means to regulate the current to the required voltage, and a packing or stuffing box for the lower bearing of the spirally-shaped blade.

Having thus fully described my invention what I claim, is:

1. In an indicating device the combination with a source of electrical energy and a circuit from said source of a means for producing variations in the current in said circuit proportional to variations in the quantity of liquid to be indicated, means responsive to the current in said circuit for indicating the variations thereof in terms of the units of the quantity to be indicated and an impermeable member disposed between the first named means and the surface of the liquid to hermetically separate same.

2. In a device for indicating the volume of liquids the combination with a source of electrical energy of a means for causing variations in the current from said source corresponding to variations in the quantity to be measured, a buoyantly operated means for actuating the above described means, an impermeable means for hermetically sealing the first named means from the buoyant means and means calibrated in units of volume responsive to the variations of current to indicate variations in terms of the units of volume.

3. In a device for indicating the volume of liquids the combination with an electrical measuring instrument calibrated in units of volume, a source of current and circuit connections between said instrument and said source of a means for causing variations in the current in the circuit corresponding to variations in the volume of liquid, means for hermetically isolating the first named means from the liquid to be measured and a buoyantly operated means associated with the said isolating means for actuating the first named means.

4. An indicating device comprising in combination, an electrical measuring instrument calibrated to indicate units of volume, a rheostat for producing continuous variations in the current corresponding to variations in the quantity of liquid to be measured, a buoyantly operated actuating means, a sealing member disposed between the rheostat and the said actuating means and adapted to hermetically isolate same, a means operatively connecting the rheostat and the actuating means and means whereby variations in the indications of said instrument, corresponding to the variations in resistance of said device, are produced.

5. In a device for indicating the quantity of a liquid, the combination with a container, a source of electrical energy and an electrical measuring instrument of a movable contact, a rheostat adapted to permit continuous engagement between the surface of the resistance element and the said movable contact, a means for actuating said contact proportionally to variations in the quantity to be indicated and a means for hermetically isolating the rheostat from the means for actuating the movable contact.

6. An indicating device comprising in combination, a source of electrical energy, a resistance, a movable contact associated with said resistance, magnetic means for operting said movable contact, means for operating said magnetic means whereby said movable contact is moved proportionally to variations in the quantity of liquid to be indicated and means responsive to variations in the current produced by movement of said contact for indicating variations in the quantity of liquid in terms of any desired units.

7. An indicating device comprising in combination, a source of electrical energy, a resistance, a movable contact associated with said resistance, magnetic means for operating said movable contact, means for operating said magnetic means whereby the variations of current from said source are rendered proportional to the quantity of liquid to be indicated, means responsive to variations of current for indicating the variations in terms of any desired units and an automatic means for indicating predetermined amounts of the quantity being indicated.

8. In an indicating device provided with a source of electrical energy, a signal connected to said source and a buoyantly operated means for operating said signal to indicate a predetermined volume of liquid, the combination of a rheostat connected to said source, a buoyantly operated means for actuating the rheostat whereby variations in the current proportional to variations in the volume of the liquid are produced, a means responsive to the variations in the current for indicating the position of the buoyant means in terms of volume and an impermeable member disposed between the rheostat and its actuating means.

9. A device for indicating the level or quantity of a liquid contained in a vessel, said device comprising a suitable float operatively connected to a magnet; a connecting-bar carrying armatures adapted to be attracted by the magnet; means for energizing said magnet to cause the connecting-bar to revolve, and means for holding and releasing the float.

10. A device for indicating the level or quantity of a liquid contained in a vessel, said device comprising a suitable float operatively connected to a magnet; a connecting-bar carrying armatures adapted to be attracted by the magnet; an insulating ring provided with a metal ring and a resistance ring; a contact-ball between each ring and the connecting-bar; means for energizing the magnet to cause the revolution of the connecting-bar, means for holding and releasing the float, a source of electrical energy, and a means for indicating variations produced by said resistance.

11. A device for indicating the level or quantity of a liquid in a vessel, said device comprising a suitable float operatively attached to an electro-magnet; a connecting-bar carrying armatures adapted to be attracted by the magnet; an insulating ring provided with a metal and a resistance ring; a contact-ball between each ring and the connecting-bar; a secondary electro-magnet and armature for holding and releasing the float, electrical means for energizing both magnets, and a means for indicating the position of the float.

12. A device for indicating the level or quantity of liquids in vessels, said device comprising a suitable float operatively attached to a magnet; armatures adapted to be attracted by the magnet; a means for controlling the movement of the float, an electrical measuring device calibrated to register the amount of liquid and means controlled by said first named armatures for determining the registration of said electrical measuring device.

13. An automatic device for indicating the level of liquids in vessels, the same comprising a source of electric energy, an electric measuring instrument, a suitable float operatively attached to a rotatable connecting-bar, a means controlled by said connecting-bar for operating said electric measuring instrument a ring of suitable material secured to said connecting-bar; starting and stopping-bars adjustably arranged on said ring, an oscillatory contact; adapted to be operated by said starting and stopping bars and a means controlled by said oscillatory contact for automatically controlling an electric circuit.

14. An automatic device for indicating a predetermined quantity of liquid in a vessel when reached, said device having in combination a suitable float operatively attached to an electro-magnet; a connecting-bar carrying armatures adapted to be attracted by said magnet; an insulating ring provided with a metal and a resistance ring; a contact-ball for the metal and resistance rings; means for indicating the position of said contact-ball on the resistance ring, means for holding and releasing the float; an auxiliary float vertically movable on a screw-threaded rod; means for adjusting said auxilary float to the level of the predetermined quantity of liquid, a source of electrical energy and electrical means for indicating when the predetermined quantity is reached.

15. In an indicating device of the character described, the combination of a rheostat for producing unintermitted variations in the current of an electric circuit with a buoyantly operated means for rendering said variations proportional to variations in the quantity of liquid to be indicated, a means controlled by the rheostat for indicating said variations in terms of the desired units, an impermeable partition separating the rheostat from the buoyant means and a means for operatively connecting the rheostat with the buoyant means.

16. In a buoyantly operated indicating device, the combination with a casing, a float, an electrical measuring device and a source of electrical energy of a rheostat composed of an insulating member with a high resistance bar and a metal contact bar embedded therein, a rotatable contact member responsive to movements of said float, electrical circuits operatively connecting the said rheostat with the said measuring instrument and electrical source, means for hermetically isolating the rheostat from the float and means operatively associated with the float for actuating the rotatable contact member.

17. A buoyantly operated indicating device comprising in combination, a float, a casing, guide rods attached at their upper ends to said casing and at their lower ends to a cross bar and adapted to prevent rotation of said float in its vertical movement, a spiral blade operatively connected to a magnet and pivotally mounted between bearings in the said cross bar and casing, said float being adapted to operate said spiral blade and thereby rotate the said magnet, a rheostat confined in the said casing, a diamagnetic partition in the said casing between the rheostat and the magnet whereby the said rheostat is hermetically isolated from the magnet, a contact ring associated with said rheostat, a rotatable contact bar carrying contact balls adapted to engage the said rheostat and contact ring, armatures attached to said contact bar and adapted to coact with the said magnet to cause the rotation of said contact bar upon the movement of the said float, a means for energizing the said magnet, a means for controlling the vertical movement of the said float, the said contact bar, rheostat and magnet being adapted for connection in circuit with a source of electrical energy, electrical means for indicating the position of the said contact balls on the said rheostat and automatic means for indicating a predetermined quantity of liquid.

18. A buoyantly operated indicating device comprising in combination, a casing, a float, guide rods attached to said casing, a spiral blade, means operatively connecting said float to the said spiral blade, a rheostat composed of an annular insulating plate provided with concentric grooves in the face thereof, one of said grooves being provided with a compressed high resistance substance and the other groove being provided with a metal contact ring, an air gap in the said resistance member, a contact bar provided with contact balls adapted to travel upon the contents of the said concentric grooves, a means for controlling the operation of the said float, armatures attached to said contact bar and adapted to coact with the said magnet to operate the said contact bar upon the release of the said float, means for hermetically separating the magnet from its armatures, an electrical measuring device connected in circuit with the said resistance member and the contact ring of the rheostat and with a source of electrical energy, an electrical circuit connecting the said magnet to the said electrical source and a switch for controlling the said circuits.

In testimony whereof I affix my signature in presence of two witnesses.

SAMUEL F. COLE.

Witnesses:
GEORGE E. TOLSON,
ANITA COLE.